(12) United States Patent
Baum (10) Patent No.: US 7,198,313 B2
(45) Date of Patent: Apr. 3, 2007

(54) HOME FURNISHINGS AND THE LIKE MOBILE SELLING SYSTEMS AND METHODS

(76) Inventor: Mark L. Baum, 249 S. Hwy. 101, Suite 432, Solana Beach, CA (US) 92075

( * ) Notice: Subject to any disclaimer, the term of this patent is extended or adjusted under 35 U.S.C. 154(b) by 0 days.

(21) Appl. No.: 10/734,135

(22) Filed: Dec. 15, 2003

(65) Prior Publication Data

US 2005/0127698 A1 Jun. 16, 2005

(51) Int. Cl.
*B60R 13/00* (2006.01)
(52) U.S. Cl. ..................... 296/21; 296/24.36
(58) Field of Classification Search ............ 296/24.36, 296/21
See application file for complete search history.

(56) References Cited

U.S. PATENT DOCUMENTS

| | | | |
|---|---|---|---|
| 4,019,773 A | 4/1977 | Vehling | |
| 4,223,938 A | 9/1980 | Born | |
| 4,480,866 A | 11/1984 | Komatsu | |
| 4,616,870 A | 10/1986 | Halden | |
| 5,029,935 A | 7/1991 | Dufrancatel | |
| 5,310,209 A | 5/1994 | Holman | |
| 5,375,899 A | 12/1994 | Wright | |
| 6,145,230 A | 11/2000 | Holmberg | |
| 6,182,795 B1 | 2/2001 | Boerer | |
| 6,585,305 B2 | 7/2003 | Nazginov et al. | |
| 6,631,526 B1 | 10/2003 | Enright | |

*Primary Examiner*—Joseph D. Pape
(74) *Attorney, Agent, or Firm*—Stephen B. Parker; Watchstone P & D, plc (57) ABSTRACT

In some illustrative embodiments, a method for the mobile sale of sleeping devices includes: loading display sleeping devices upon a vehicle; driving said vehicle to a consumer; selectively presenting a plurality of said display sleeping devices to said consumer in a display area, whereby said consumer can lay upon said plurality of display sleeping devices to test the same; collecting information from said consumer regarding at least one desired one of said sleeping devices for purchase. In addition, various embodiments are also disclosed that pertain to the selling of furniture or the like items, such as, e.g., sleeping devices, sitting devices and/or the like. Among other things, some embodiments can be used for facilitating the delivery of various goods to consumers.

43 Claims, 7 Drawing Sheets

HOME FURNISHINGS AND THE LIKE MOBILE SELLING SYSTEMS AND METHODS

BACKGROUND

1. Field of the Invention

The present invention relates to the selling of home furnishings and the like items. Some preferred embodiments provide improved systems and methods for selling home furnishings and the like items via a mobile vehicle. The preferred embodiments can advantageously be used to sell various items, and especially, home furnishings, such as, e.g., furniture items, such as by way of example, beds, mattresses, box springs, bed frames, other bed components, sofas, sleeper sofas, chairs, tables and/or other furniture items.

2. Discussion of the Background

In contrast to many consumer products, home furnishings, such as, e.g., furniture items, are not amenable to mobile sales. Among other things, furniture items are typically rather large. In addition, furniture items are typically selected to suit a variety of consumer needs, such as, e.g., physical needs (e.g., ergonomic needs) and aesthetic needs (e.g., subjective needs). As a result, consumers of furniture items typically need to carefully test a substantial number of furniture items before making a purchase. Due to, among other things, this common need to test a substantial quantity of items, which items are already rather large items, furniture items have not been amenable to mobile sales.

This lack of amenability to mobile sales has a variety of drawbacks. Among other things, because consumers typically must travel to a site of a furniture store, such required travel can be difficult, especially for consumers having travel difficulties, such as, e.g., elderly consumers, handicapped consumers, vehicleless consumers and/or the like. To make matters worse, in view of the large inventories needed and the large item sizes, furniture stores are often at more remote locations, such as, e.g., at geographical locations where commercial property is less expensive (i.e., to enable display of sufficient furniture items without undue expenses). Thus, to purchase furniture items, consumers often must travel even further than they otherwise may need to travel for non-furniture items.

In addition, the substantial amount of inventory space required in consumer furniture retail stores can be rather expensive. These expenses are, understandably, passed on to the consumers via increased costs for furniture items. Thus, furniture items are often not only more difficult to purchase than some other types of items, but they are often more inflated in price than some other types of items. Additionally, even if a consumer travels all the way to a furniture store and pays an inflated price due to inventory costs, often the consumer cannot even take the product home with him due to the large size of the furniture item. Often, the consumer must then pay an additional shipping fee to have the item delivered at a later date.

While a variety of mobile sales systems and methods have been known, prior to the present invention, there was a substantial need (although this need was not known or appreciated to those in the art) for mobile sales systems and methods for the sale of furniture and the like items. The present invention provides substantial advances over the rather limited existing systems and methods, such as, e.g., that described in the following patents: (1) U.S. Pat. No. 6,585,305 entitled Mobile Showroom Advertising Vehicle (see, e.g., column 3, lines 36+ of the patent which admits that "[a] limitation of the mobile showroom 10 is that the interior space 16 available for the display of merchandise such as sofas, chairs, etc., is quite obviously limited, inasmuch as only a few samples of a couch or a chair or a lamp can be displayed at a time"); (2) U.S. Pat. No. 6,182,795 entitled Method for Mobile Sales and Vehicles Therefore (see, e.g., Abstract which explains that "the present invention relates to a method of selling merchandise, particularly clothing fashions and accessories, to customers at locations convenient to the customer"); (3) U.S. Pat. No. 5,375,899 entitled Mobile Display Pavilion (see, e.g., Abstract which explains that "[e]ach embodiment includes . . . a door or doors that swing down to a slanted position . . . for receiving and displaying merchandise"); (4) U.S. Pat. No. 5,310,209 entitled Vehicles for Transportation and Display of Articles of Merchandise (see, e.g., column 1, lines 62+ which explain that "[i]t is a prime object of the present invention to provide mobile article display vehicles which are maneuverable into closely defined spaces . . . "); (5) U.S. Pat. No. 4,616,870 entitled Mobile Display System (see, e.g., Abstract which explains that the disclosure involves "[a] mobile system for carpet samples and the like which includes . . . a plurality of racks"); (6) U.S. Pat. No. 4,480,866 entitled Vehicle for Displaying Goods (see, e.g., Abstract which explains that the "vehicle for displaying goods comprises a main body having opposite side walls and a display subbody" that moves outward to increase internal room of the vehicle for display); (7) U.S. Pat. No. 4,223,938 entitled Mobile Showroom With Living Quarters; and (8) U.S. Pat. No. 4,019,773 entitled Mobile Carpet Display Center.

Prior to the present invention there has been a need in the art for improved systems and methods for selling furniture and/or the like.

BRIEF DESCRIPTION OF THE DRAWINGS

The preferred embodiments of the present invention are shown by a way of example, and not limitation, in the accompanying figures, in which.

SUMMARY OF THE INVENTION

The preferred embodiments of the present invention can significantly improve upon existing methods and/or apparatuses.

According to some embodiments, a method for the selling of merchandise is performed that includes: loading merchandise within a vehicle body; transporting the vehicle body to a location; selectively presenting display items of the merchandise to the consumer in a display area inside the vehicle body, wherein the selectively presenting includes facilitating the selective presentation using a power source or manual-assist device.

According to some embodiments of the invention, a furniture sales vehicle is provided that includes: a driver area; a furniture display area; a mechanism for selective presentation of furniture items in the furniture display area for selective presentation to a consumer.

According to other embodiments, a method for selling furniture is performed that includes: loading display furniture items upon a vehicle; driving the vehicle to a consumer; selectively presenting the furniture items to the consumer in a display area.

In some implementations, the furniture display area is inside an interior of the vehicle. However, in some implementations the furniture display area is external outside an exterior of the vehicle. In some embodiments, the vehicle is a truck. In some embodiments, the truck includes communication means for a driver or truck operator to communicate with a dispatch office. In some embodiments, the furniture includes sleeping devices, and, in some preferred embodiments, the sleeping devices include mattresses. The terminology sleeping devices encompasses any devices and/or components thereof which are used to facilitate sleeping (which devices, e.g., typically support the user in a generally horizontal position, but not necessarily, such as, e.g., seen in various adjustable beds, etc., which may support users in a variety of non-horizontal positions). Illustrative sleeping devices may include, by way of example, complete beds, mattresses, foundations, box springs, bed frames, headboards, footboards, etc. In various embodiments, mattresses can include any appropriate support mechanism and may include, e.g., box springs, wood foundations and/or foam foundations. In some embodiments, mattresses can include a soft, compressible and/or conformable top surface upon which a user can rest with the mattress distributing pressure across an area of the user. In some embodiments, the furniture includes sitting devices, and, in some preferred embodiments, the sitting devices include chairs, sofas or couches. In some embodiments, the sitting devices include sleeper sofas. In some embodiments, the mechanism for selective presentation includes a conveyor mechanism. In some preferred embodiments, the mechanism for selective presentation includes a user operated control interface. In some implementations, the mechanism for selective presentation includes a mechanism for facilitating transfer of items between at least one storage location and at least one presentation location. In some implementations, the mechanism for facilitating transfer includes a counterweighted lifting mechanism. In some implementations, the mechanism for facilitating transfer includes a mechanism to impart vertical movement to the furniture, and in some implementations the mechanism for facilitating transfer includes a mechanism to impart horizontal movement to the furniture.

According to some other embodiments, a method for the mobile sale of sleeping devices is performed that includes: loading display sleeping devices upon a vehicle; driving the vehicle to a consumer; selectively presenting a plurality of the display sleeping devices to the consumer in a display area, whereby the consumer can lay upon the plurality of display sleeping devices to test the same; collecting information from the consumer regarding at least one desired one of the sleeping devices for purchase. In some preferred embodiments, the method further includes collecting payment from the consumer for the at least one desired one of the sleeping devices for purchase on site at the vehicle, and, in some preferred embodiments, the collecting payment includes receiving a cash payment on site at the vehicle, receiving a credit card payment on site at the vehicle and/or receiving an electronic payment on site at the vehicle using a computer within or proximate the vehicle. In embodiments where credit card payments are received on site, the site location preferably includes electronic means to enable such credit card payments to be electronically processed by the crediting agency. In some embodiments, the consumer can be allowed to apply for customer credit with or on behalf of the entity selling the items on site at the vehicle location. Most preferably, the vehicle includes means to process such an application for credit on site at the vehicle. For example, the vehicle may include a secure on-line connection to a computer system of the entity through which credit applications can be processed. Preferably, the sleeping devices include beds, mattresses, other bed components, and/or sleeper sofas. Some implementations further include, prior to driving the vehicle to the consumer having the consumer provide a request for the vehicle to come to the consumer, and, in some preferred examples, such further includes having the consumer provide the request orally via telephone and/or having the consumer provide the request electronically via a computer network (such as, e.g., the Internet and/or other appropriate public or private network).

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Figure 1A:
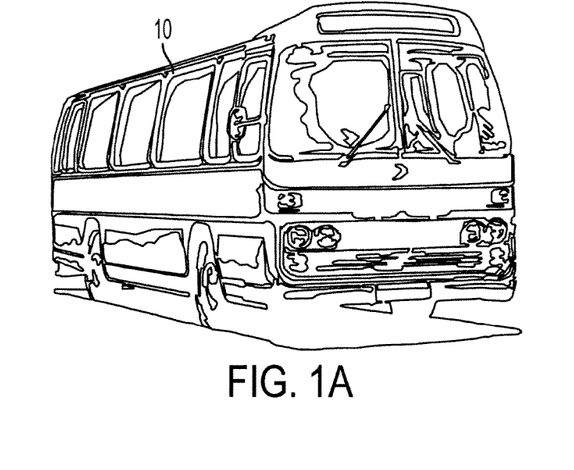
FIG. 1(A) is a front perspective view of one illustrative embodiment of a vehicle that can be used in some embodiments of the invention.
Figure 1B:
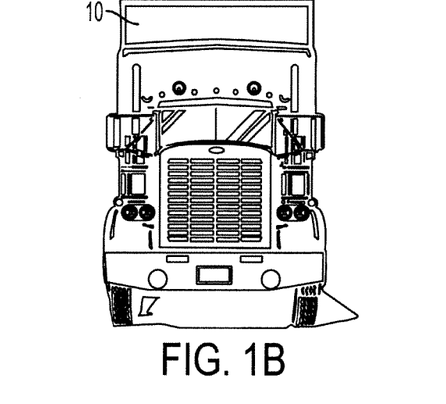
FIG. 1(B) is a front view of another illustrative embodiment of a vehicle that can be used in some embodiments of the invention.
Figure 1C:
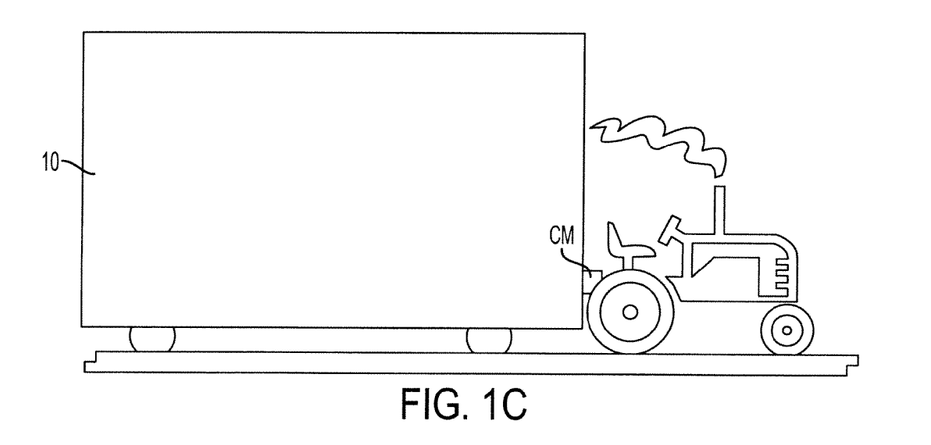
FIG. 1(C) is a side view of another illustrative embodiment of a vehicle that can be used in some embodiments of the invention.

FIGS. 1(A)–(C) show some illustrative vehicles 10 that can be employed in some illustrative embodiments of the invention. In this regard, FIG. 1(A) is a front perspective view of one illustrative embodiment in which a bus is adapted to implement features of the invention, FIG. 1(B) is a front view of another illustrative embodiment in which a truck having a rear cargo trailer (e.g., which may or may not be entirely enclosed) is adapted to implement features of the invention, and FIG. 1(C) is a side view of another illustrative embodiment in which a trailer (e.g., which may or may not be entirely enclosed) is adapted to implement features of the invention, which trailer, with connection CM, may be pulled or the like by any appropriate vehicle, such as, e.g., a car, a truck, a tractor and/or any other appropriate vehicle. It should be understood that FIGS. 1(A)–1(C) show a few illustrative vehicles and various embodiments can be employed using any sort of vehicle, as long as the vehicle is capable of being mobile, such as, e.g., even including water driven vehicles (e.g., boats), air driven vehicles (e.g., planes) and/or other appropriate vehicles. Some illustrative vehicles can include, busses, trucks with attached "boxes" as cargo holding areas (such as, e.g., vehicles commonly called "box vans" or "box trucks"), tractor trailer trucks (including, e.g., those having a truck cab and a separate removable box), and/or the like. In some embodiments, the vehicle can include a vehicle body or body unit (such as, e.g., a trailer or the like structure which may include a display area such as, e.g., described herein) that is attachable to a cab or drive unit (such as, e.g., having a fuel driven motor, a driver area and/or the like). In this regard, in some embodiments, a body unit can be located at a desired location for a particular period of time (such as, e.g., one or more days, weeks and/or months) and can be transportable by attachment to a cab or drive unit. By way of example, a body unit could include a structure similar to a mobile home, a camper, a UHAUL trailer and/or the like having a hitch mechanism or other attachment means for towing the body unit, while the drive unit could include, e.g., a truck with a corresponding tow hitch or the like connectable thereto. In some embodiments where a vehicle or a body unit are located at a particular site for an extended period of time, the vehicle or body unit can, if desired, be loaded with items (such as, e.g., display items and/or storage items [i.e., if storage items are stored]) by another vehicle, which may, e.g., be used to replenish the supply by transporting items from a warehouse or the like).

Figure 2:
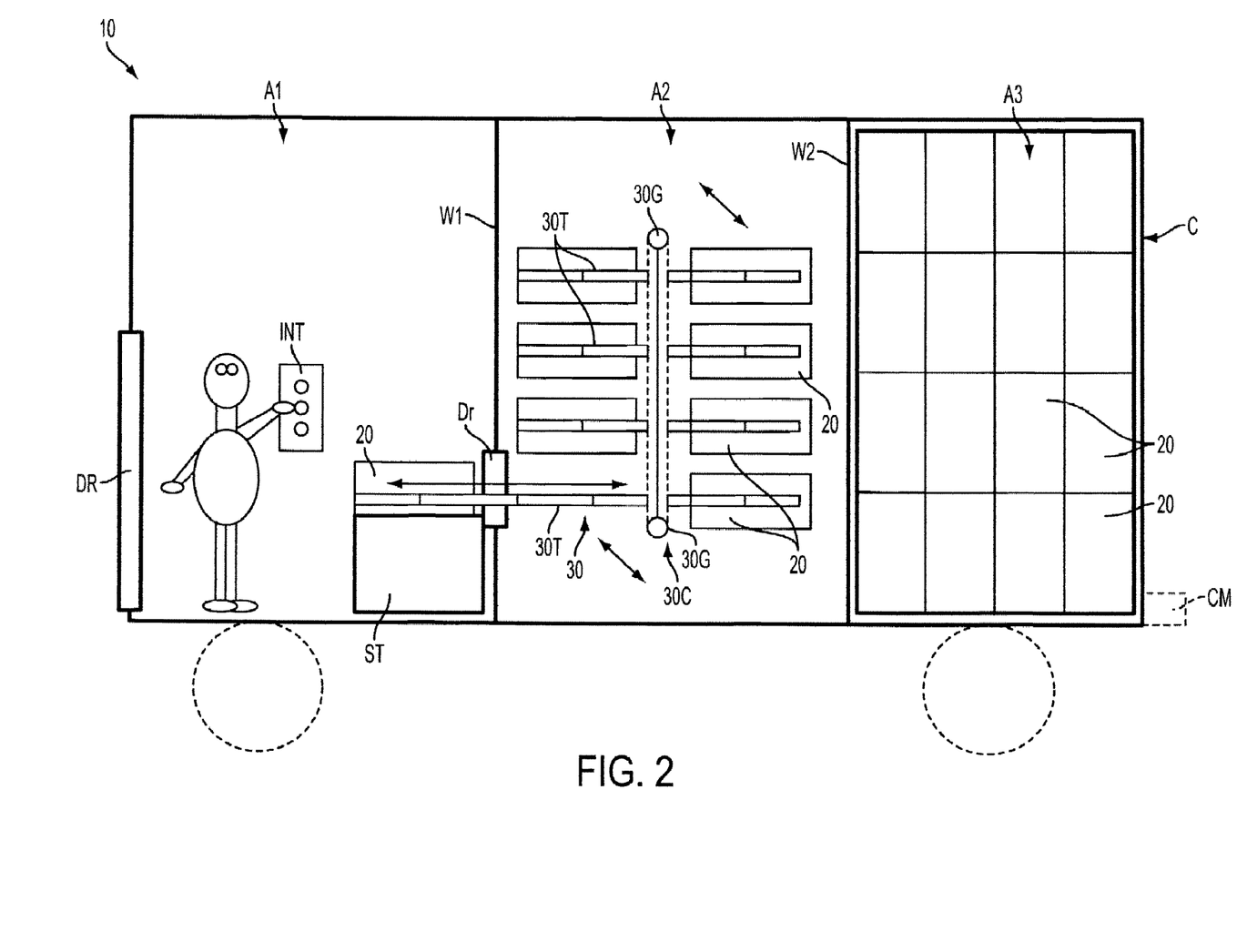
FIG. 2 is a side view of an interior of a vehicle according to some embodiments of the invention.

FIG. 2 is a side view of an interior of a vehicle 10 according to some embodiments of the invention. In this illustrative embodiment, the vehicle 10 preferably includes a substantially enclosed compartment C that is used for display of product, such as, e.g., home furnishings, such as, e.g., furniture items, carpets, floor coverings, home electronics, gymnasium equipment, exercise equipment (including, e.g., treadmills, exercise cycles, home gym equipment, etc.). In other embodiments, however, the area C can be only partially enclosed and/or can been substantially open, such as, e.g., on a roofless trailer. In the preferred embodiments, the furniture items preferably include one or more of the following items: beds, mattresses, box springs, bed frames, bedding linens, headboards, footboards, other bed components, sofas, sleeper sofas, chairs, tables (such as, e.g., kitchen tables, dining room tables, etc.) and/or other furniture items. Additionally and/or alternatively, in some other embodiments, the items sold can include other household items, such as, e.g., preferably fixtures, such as, e.g., lighting fixtures (such as, e.g., lamps, chandeliers), mirrors and/or the like. In the most preferred embodiments, the furniture items include mattresses. In the illustrative example shown in FIG. 2, for instance, a plurality of mattresses 20 are depicted.

In the embodiment shown in FIG. 2, the vehicle 10, with connection CM, includes a plurality of areas. A first area A1 is provided for the display and presentation of items, such as, e.g., mattresses 20. A second area A2 is provided for the storage and retrieval of display items to be provided to and returned from the first area A1. In the embodiment illustrated in FIG. 2, the area A1 is separated from the area A2 by a separation wall W1. While this separation can be beneficial from the perspectives of a) aesthetic appeal of the display area A1 and b) separating components within A2 from the consumer, in some embodiments the areas A1 and A2 can be areas within a common open area. In addition, in some embodiments, the areas A1 and A2 can be areas within a common open area. In addition, in some embodiments, the area A1 and/or A2 can each include a plurality of independent areas at a plurality of locations within the vehicle 10.

The third area A3 shown in the illustrative example of FIG. 2 is an optional area that can be included in some preferred embodiments. It should be appreciated, however, that a third area A3 can be omitted in various embodiments. In this regard, the third area A3 can essentially be a storage area containing a suitable number of items to be provided upon sale to the consumer. In FIG. 2, items 20 can be stored in the area A3 in any desired manner, such as, e.g., in compartments, on shelves, stacking and/or using any other appropriate means. Thus, in preferred embodiments, a consumer can, e.g., test a trial item (such as, e.g., a trial mattress in area A1) and then receive another item (e.g., a new, pre-packaged and/or clean item) contained in storage area A3. In this manner, the sale can be completed (i.e., including transfer of the item purchased) at the consumer location. As indicated, in some embodiments, storage area A3 can be omitted and/or can be very limited, such that consumers, upon making a selection, can receive such items at a later date (e.g., via a future delivery or the like). Additionally, in some embodiments, the consumer can purchase the actual display items. In the embodiment shown in FIG. 2, the area A2 is separated from the area A3 by a separation wall W2. While separation can be beneficial, in some embodiments, the wall W2 can be omitted. In addition, in some embodiments, the areas A1, A2 and/or A3 can include a plurality of independent areas at a plurality of locations within the vehicle 10.

In addition, in some embodiments, the positioning of the various areas A1–A3 can be modified as desired and/or various other modifications of the arrangements can be chosen. In this regard, while an illustrative arrangement is shown in FIG. 2, it is contemplated that a variety of other arrangements can be chosen in other embodiments. For example, the various locations of the areas A1–A3 can be varied widely based upon circumstances, such as, e.g., having areas vertically arranged one over the other, separated into multiple areas and/or sub-areas, etc.

FIG. 2 shows an illustrative mechanism M 30 for selective presentation of furniture items (in the illustrated example, mattresses) in said furniture display area A1 for selective presentation to a consumer (consumer not shown). In this first illustrative example, the mechanism 30 includes a conveyor 30C having a conveyor belt, chain or the like (shown in dashed lines) rotatably supported on gears 30G as shown. A plurality of translational support members 30T (such as, e.g., including telescoping members or the like) are fixedly attached to said conveyor in a manner to move in a generally orbital path along with the movement of the conveyor, such as, e.g., as shown by the bold double-headed arrows in FIG. 2. The support members 30T each support a respective item of furniture (e.g., a mattress as shown). In this manner, the conveyor can be driven via a drive mechanism, such as, e.g., a motor (not shown) until a desired furniture item is aligned with an opening in the wall W1. Then, the support member can be extended so as to move the desired item (i.e., a mattress in the illustrative example) to the area A1. In this example, the desired test mattress is extended through an opening or door Dr so as to be presented upon a suitable stand ST (such as, e.g., a platform, a bed frame or the like) for testing by a consumer. In this regard, the consumer (not shown) can then freely rest upon the test item as desired (e.g., to try it out).

In the preferred embodiments, items moved into the display area A1 are placed therein so as to be in a use position of the item. In this regard, for example, mattresses or beds or the like are preferably placed substantially horizontally and at substantially a normal use height from a floor to facilitate consumer testing under normal use conditions. Similarly, other various items, in other various embodiments are preferably placed into a normal use position, such as, e.g., in some embodiments, a) carpets or floor coverings are preferably located upon a floor region such that a user can observe the same in normal use, walk thereon, etc., as in normal use, b) exercise equipment (such as, e.g., treadmills, etc.) are preferably located in normal use position (e.g., upright) both from the standpoint of actual use—i.e., in which a user is on the equipment—and preparing for use—e.g., such as, e.g., climbing or stepping on the equipment from a floor area, c) chandeliers and/or other ceiling lighting is preferably located for display overhead similar to in actual use, d) window treatments or windows (which can be items of merchandise sold in some embodiments) are preferably located along a wall for display in a similar manner to normal use (for example, windows and/or window treatments (such as, e.g., shades, blinds, etc.) can be placed on display in such a manner that a display window and/or window treatments can be located proximate a side of the vehicle and such that a user actually sees out of the truck via the window and/or window treatments on display so as to create a realistic impression of that window during use (e.g., by aligning with an opening in the vehicle and/or a window in the vehicle wall). In addition, equipment that is electronically driven or powered is preferably connected to an appropriate power source during display use, such as, e.g., electronic exercise equipment (such as, treadmills), light fixtures, etc.

FIG. 2 also shows an illustrative control interface INT which can be operated by a user (such as, e.g., a vehicle operator, a salesperson or the like as shown) to present the desired test item to the consumer. As should be appreciated, after testing a certain item, the interface INT can be used to cause the system to remove the last test item and to replace the same with a subsequent test item as desired.

With reference to FIG. 2, in this illustrative embodiment, the consumer can enter the display area A1 via a door DR accessible from an exterior of the vehicle. Although not shown, in some embodiments, to facilitate access to the vehicle, a set of stairs can be located and/or locatable adjacent the door DR to facilitate consumer access to the vehicle. Although not shown, the display area A1 can preferably also include additional items to facilitate consumer purchasing and/or decision-making, such as, e.g., consumer catalogues, comparative information, a computer terminal with Internet access for on-line product information (such as, e.g., comparative pricing and/or more), a telephone and/or other items. Additionally, the area A1 preferably also includes a comfortable discussion area, including at least one chair for a consumer to sit upon while discussing sales information with a sales representative. Additionally, the area A1 may also include a television or other video presentation means to present the user with commercials and/or other information related to products.

In some embodiments, the vehicle can be used for, among other things, the purpose of displaying items to consumers (e.g., sales efforts), but also for the purpose of traveling to a consumer location to make an evaluation, study, review and/or the like of a consumer's location (e.g., a consumer's home, office or the like). By way of example, if items are carpets, then a vehicle operator or the like can, concurrently with the display to the consumer and/or during the same visit at that location, enter the premises of the consumer to take measurements, survey and/or otherwise review the consumer location. In this manner, a consumer can make a selection and appropriate measurements can be made without the need to send another vehicle at a later date for such services. Additionally, in some embodiments where items are contained on the vehicle, the items can even be installed at that time. In other embodiments, the items can be installed at a later date. Similarly, in various embodiments, a vehicle operator or salesman or the like can also make evaluations of the consumer location to make suggestions for that consumer, such as, e.g., for interior decorator purposes (e.g., to ensure that proper aesthetic qualities, such as, e.g., colors and/or sizes, are selected for the user location, etc.), for consumer practices, lifestyle, environment and/or other purposes (e.g., to make suggestions regarding exercise equipment based on consumer space, based on consumer physical activity level or the like [which may be based on observation of the consumer, the consumer's environment, etc.]). In this manner, higher quality sales services can actually be provided because the salesman will be able to learn more about the customer's needs, location, lifestyle, practices, etc.

In some illustrative embodiments, the salesperson is located physically in the area A1 with the consumer during the consumer's evaluations. However, in some other embodiments, the salesperson can be located in another location. In some illustrative examples, the salesperson can be located within a driver's compartment of the vehicle and can have communication means (such as, e.g., speakers, microphones, etc.) to communicate with the consumer in the area A1 (e.g., at the rear of the vehicle). In addition, the salesperson can also include a means to remotely control the presentation of the furniture items in the area A1, such as, e.g., having controls located in the driver's area (note: the controls can also potentially be operated via a portable control interface in some embodiments).

In other illustrative examples, the salesperson can be located entirely remotely from the vehicle itself. In this regard, the driver of the vehicle does not necessarily have to facilitate the sale. By way of example, the display area A1 or other area of the vehicle can include a mechanism by which a consumer can communicate to a remote sales location (such as, e.g., a telephone, a videophone, a computer with network communications, such as, e.g., e-mail, instant messaging, etc.). In this manner, the driver can allow a consumer to enter or access the area A1 of the vehicle, and can facilitate some operations, as needed, but the driver does not need to completely carry out sales functions. In this manner, individuals with significant sales experience and abilities can handle sales without needing to operate the vehicle and/or to be physically present in and travel with the vehicle. In some embodiments, the remote sales persons may even be able to remotely control the mechanism 30 so as to assist the consumer in selection and testing. In this manner, for example, a single remote salesperson can even be used to handle sales at a plurality of remote vehicle 10 locations, increasing efficiencies and reducing costs.

In some embodiments, a company controlling and managing the vehicle 10 may have a fleet of such vehicles. In some embodiments, the various vehicles may include like items for sale, such that, e.g., each vehicle includes essentially the same items. However, in some embodiments, the various vehicles may include different items therein, such as, e.g., mattresses in one set of vehicles, tables in another set of vehicles and/or sofas in another set of vehicles. In this regard, one or more vehicle may be dispatched to a particular consumer location as desired. Additionally, upon locating one vehicle at a consumer location, based upon a consumer request (such as, e.g., a request made on site based upon a consumer's review of on site catalogue information or the like) another vehicle may potentially be dispatched to the customer location.

In some embodiments, upon receiving a customer request, the particular vehicle 10 dispatched to the customer can be either a) selected based upon the items already known to be contained therein (such as, e.g., by electronically reviewing a database of items in its storage area A3 and/or presentation area A2 and/or b) stocked—e.g., at a warehouse—to include items of interest based upon the customer's specific request.

In some illustrative examples in which a vehicle contains mattresses for review by a consumer, the vehicle preferably has at least 3 different types of mattresses that can be presented in the area A1. In some illustrative examples in which a vehicle contains mattresses for review by a consumer, the vehicle preferably has at least 5 different types of mattresses that can be presented in the area A1. In some illustrative examples in which a vehicle contains mattresses for review by a consumer, the vehicle preferably has at least 7 different types of mattresses that can be presented in the area A1. In some illustrative examples in which a vehicle contains mattresses for review by a consumer, the vehicle preferably has at least 9 different types of mattresses that can be presented in the area A1. In some illustrative examples in which a vehicle contains mattresses for review by a consumer, the vehicle preferably has at least 11 different types of mattresses that can be presented in the area A1. In some illustrative examples in which a vehicle contains mattresses for review by a consumer, the vehicle preferably has at least 13 different types of mattresses that can be presented in the area A1. In some illustrative embodiments, the mattresses can include any of the following standard sizes: twin (about 39 inches by 75 inches); full (about 54 inches by 75 inches); queen (about 60 inches by 80 inches); king (about 78 inches by 80 inches); and/or other standard sizes. In some embodiments, the test samples can be full size samples. In some examples, the test samples can be reduced size samples, such as, e.g., twin size or less for space savings. Illustrative mattresses can include, mattresses made by SEALY, SERTA, SIMMONS, TEMPUR PEDIC and/or any other known mattress manufacturers. Various mattress types can be employed, such as, e.g., traditional mattresses, mattresses having internal metal coils, foam mattresses, air mattresses, water-filled or partially water-filled mattresses and/or other now or later known mattress types. Other illustrative mattresses can include, e.g., futon mattresses and/or various non-standard size mattresses.

Figure 3:
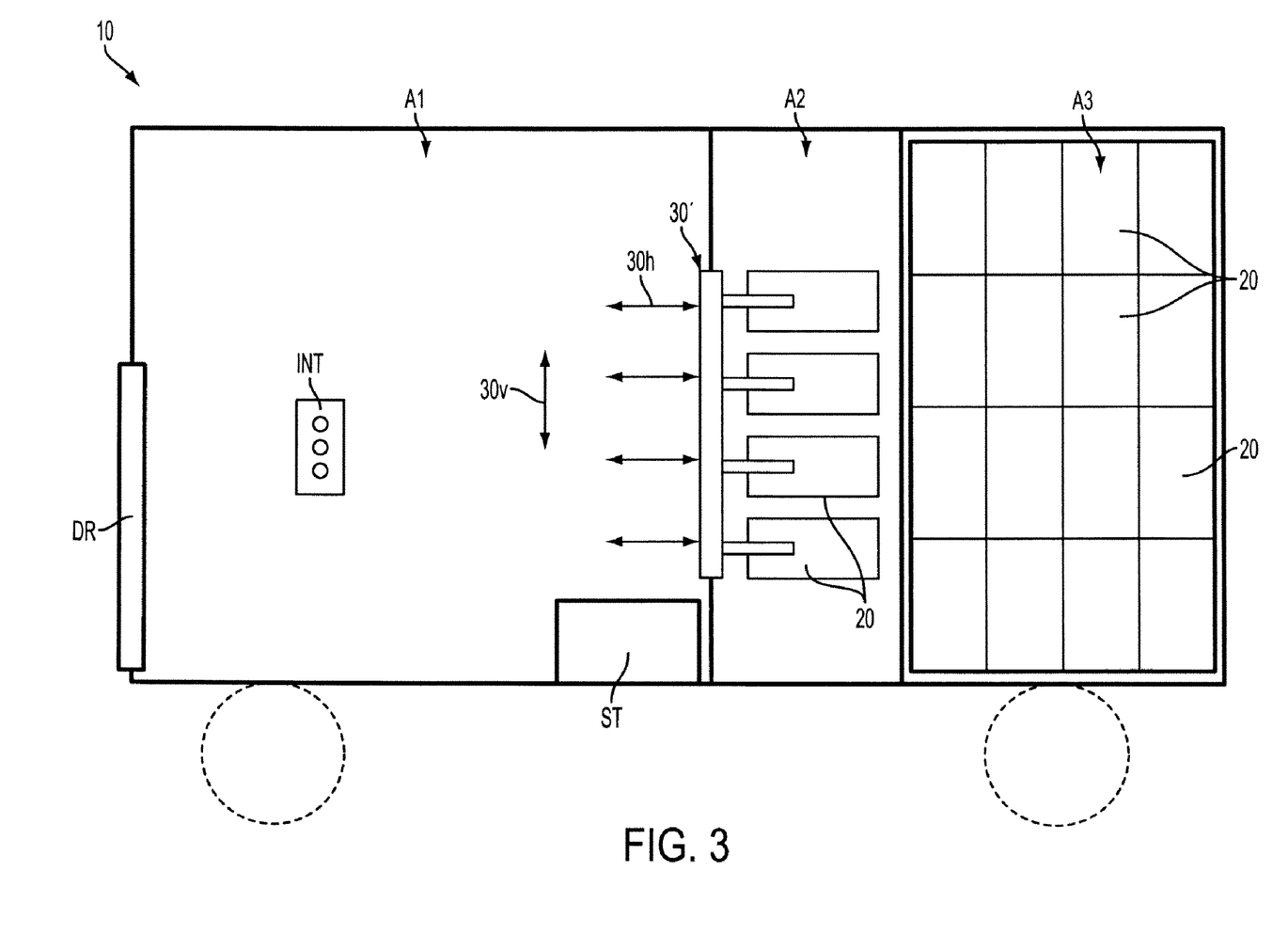
FIG. 3 is a side view of an interior of a vehicle according to other embodiments of the invention.

FIG. 3 is a side view of an interior of a vehicle according to other embodiments of the invention. In FIG. 3, components that are generally similar to that shown in FIG. 2 are indicated with like reference numbers. FIG. 3 shows another illustrative example of a mechanism 30' for selective presentation of furniture items (in the illustrated example, mattresses) in said furniture display area A1 for selective presentation to a consumer. In this illustrative embodiment, the mechanism 30' effects both vertical movement 30v and horizontal movement 30h of the items 20 between storage location(s) in region A2 and display position(s) in region A1. As should be apparent to those in the art, the mechanism 30' can be constructed in a variety of ways, such as, e.g., using vertical and horizontal linear bearing members, robotic control mechanisms, rack-and-pinion mechanisms, screw shafts, vertical and horizontal conveyors and/or any other appropriate mechanisms. In the example shown in FIG. 3, a desired test mattress is moved into the region A1 and towards the stand ST for testing by a consumer. In this regard, the consumer (not shown) can then freely lay upon the test item as desired. As with FIG. 2, FIG. 3 also shows an illustrative control interface INT which can be operated by a user (such as, e.g., a vehicle operator, salesperson or the like), to present the desired test item. As should be appreciated, after testing a certain item, the interface can be used to effect removal of the latter test item and replacement of the same with a subsequent test item as desired.

Figure 4A:
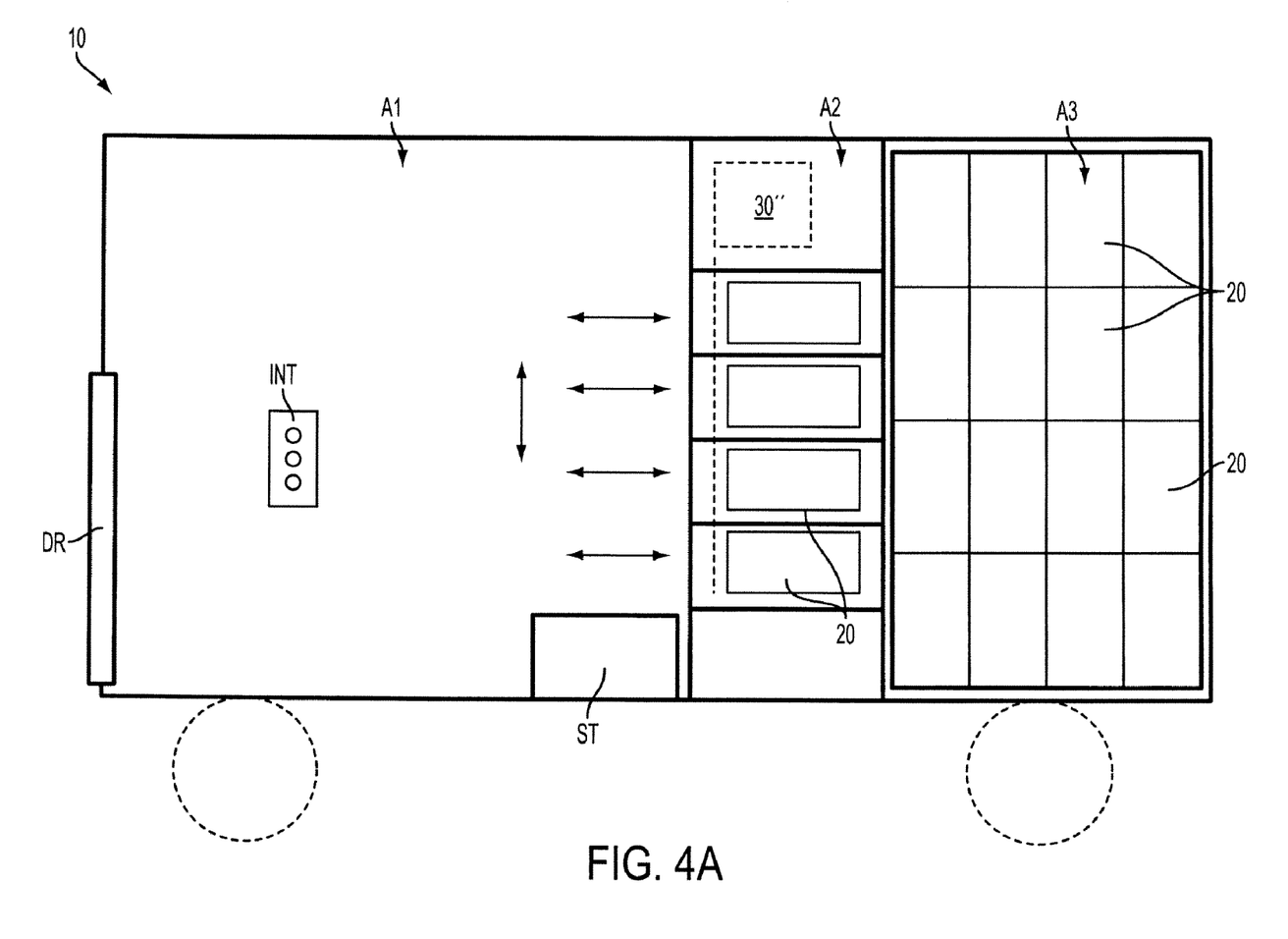
FIGS. 4(A) and 4(B) are side views of interiors of vehicles according to other embodiments of the invention.

FIG. 4(A) is a side view of an interior of a vehicle according to other embodiments of the invention. In contrast to the embodiments shown in FIGS. 2–3 which include mechanisms 30, 30', the embodiment shown in FIG. 4(A) includes storage spaces (e.g., compartments, shelves and/or the like as shown) for display items, such as, e.g., mattresses 20, in the region A2. In the example shown in FIG. 4(A), in order to display a particular example of the items 20, the particular example is lowered to the stand from the storage spaces in A2. In this example, there does not need to be any automatic means for effecting transport of the items. Here, a user can preferably manually raise and/or lower the items and place them in respective storage locations. By way of example, the storage locations in region A2 can merely be, for example, support structures such as, e.g., a plurality of shelves, a book case and/or the like (such as, e.g., four generally horizontal shelves shown in FIG. 4(A)).

In some embodiments, the system shown in FIG. 4(A) can, optionally, include a mechanism 30" (shown in dashed lines in FIG. 4(A)) for selective presentation of furniture items (in the illustrated example, mattresses) in said furniture display area A1 for selective presentation to a consumer that either includes a drive mechanism such as, e.g., a motor to effect movement and/or a mechanism to facilitate manual handling of large items, such as, e.g., a pulley system, a counterbalance system and/or the like to facilitate lifting of large furniture items. By way of example, the respective items could be connected to cables which enable the items to be lowered but which have counterweights attached to facilitate manual return of the items.

Figure 4B:
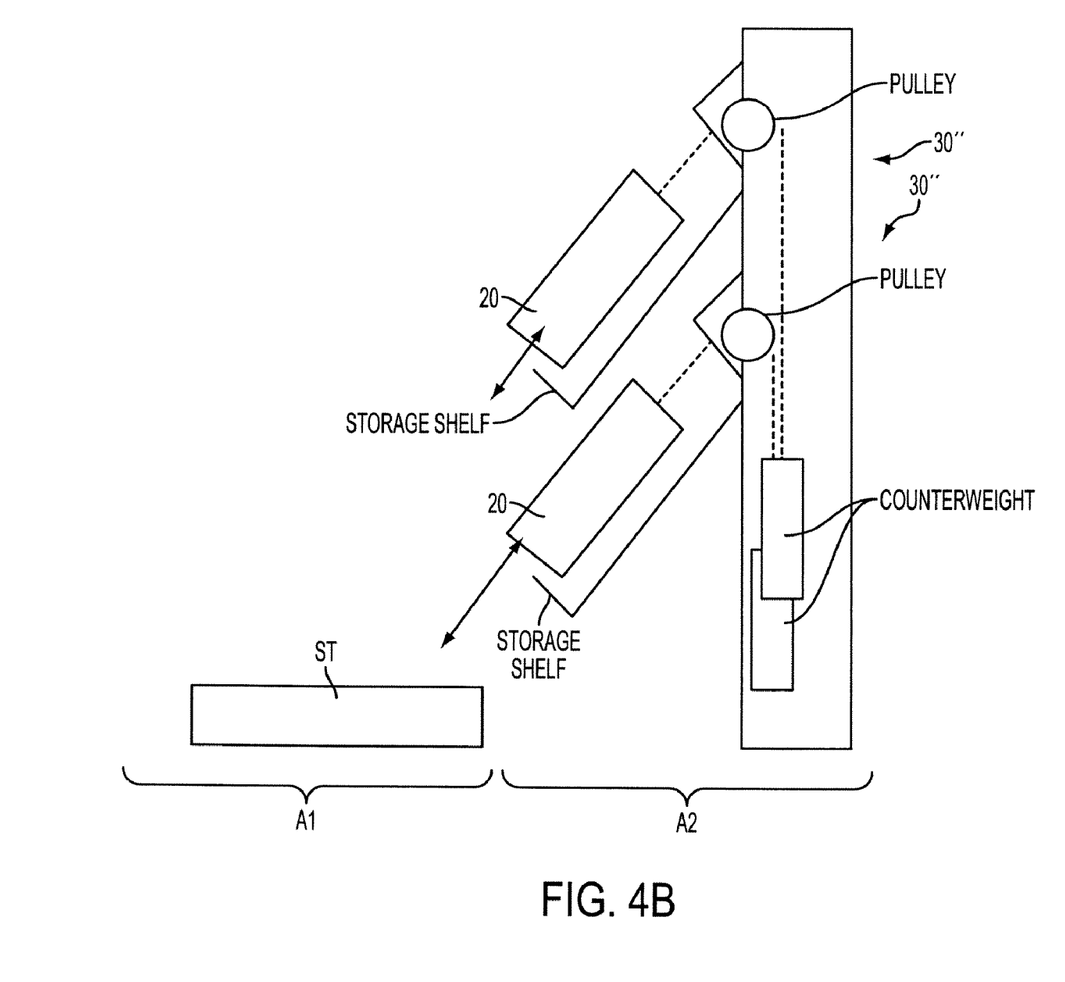

FIG. 4(B) shows another illustrative embodiment in which inclined storage shelves are employed and in which a pulley and counterweight system is utilized to facilitate raising and/or lowering of heavier furniture items, such as, e.g., mattresses or the like. As shown, the items can be moved from storage in area A2 to one or more display location, such as, e.g., to stand ST which is in a display area A1. In this illustrative example, the items 20 (such as, e.g., mattresses) are illustrated as being located upon inclined storage shelves, which can have a retaining front edge as shown. As shown, a cable can extend from a rear of the items to a respective counterweight. In this manner, a user can readily move heavier items off of the respective shelves and down to the stand ST and vise-versa due to the reduction in load by way of the counterweight(s).

Figure 5A:
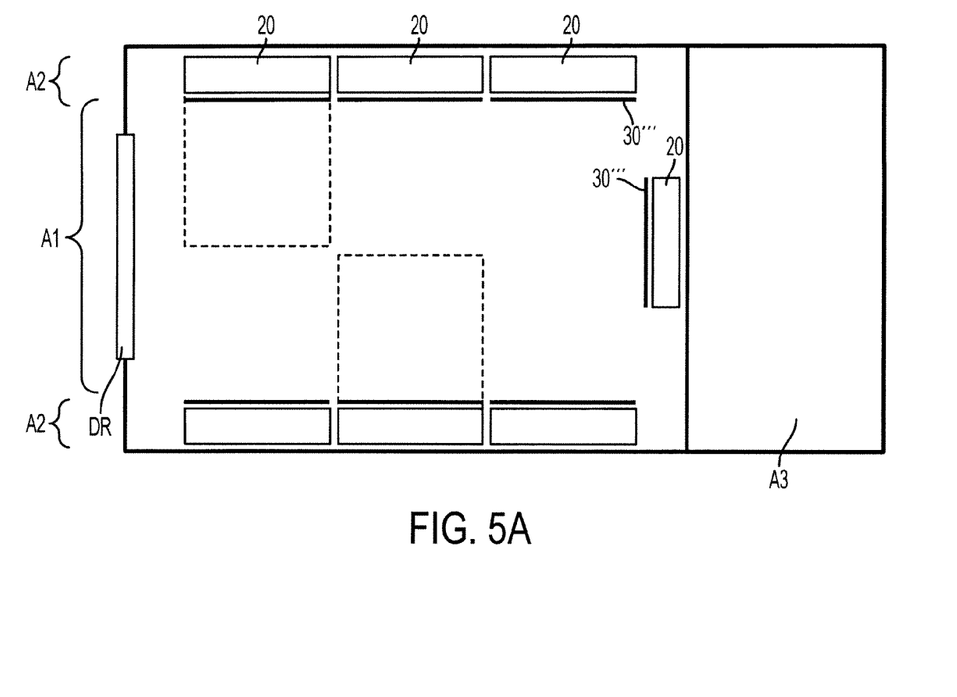
FIG. 5(A) is a top plan view of an interior of a vehicle according to other embodiments of the invention.
Figure 5B:
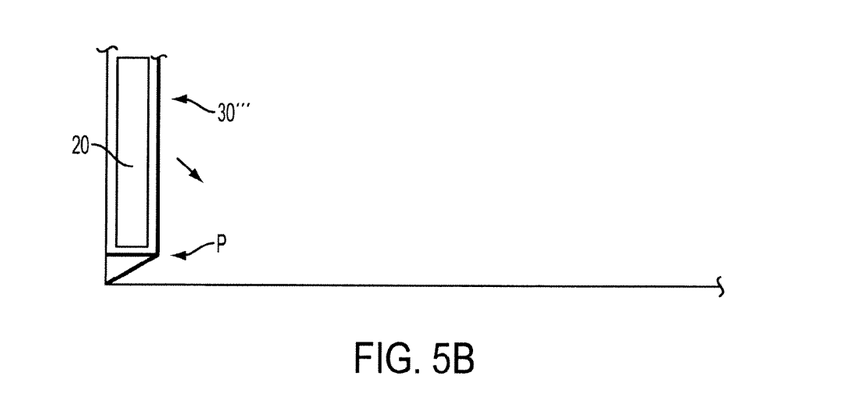
FIG. 5(B) is a side view of a portion of the interior of the vehicle shown in FIG. 5(A)

FIG. 5 is a top plan view of an interior of a vehicle according to other embodiments of the invention. In these illustrative embodiments, a mechanism 30''' for selective presentation of furniture items (in the illustrated example, mattresses) in a furniture display area A1 for selective presentation to a consumer can be provided that includes a frame for supporting mattresses in a storage area A2 (such as, e.g., along side a wall) away from a display area A1 and a pivot P about which the frame member can be moved to bring the mattress items downwards in the direction of the arrow shown in FIG. 5(B) into the display area A1 as shown by dashed lines in FIG. 5(A). In some embodiments, the mechanism 30''' can be counterbalanced and/or can include some other mechanism, such as, e.g., a spring mechanism, in order to limit the forces that must be applied to move the items. While a drive mechanism, such as, e.g., a motor need not be employed in this embodiment, such may be used in some implementations.

In some embodiments, an item 20 can include a mattress alone, in other embodiments an item 20 can include a combination mattress and foundation or boxspring, in other embodiments an item 20 can include a single-piece combination mattress/foundation or boxspring, and/or in other embodiments an item 20 can include various other items as would be understood based on this disclosure.

In some embodiments, with reference to FIG. 5(B), the product could be pulled outward (such as, e.g., either by pulling from a top end, pulling from a bottom end and/or pulling from another portion) in such a manner that the item is moved to its normal upright position during normal use of the item. In some embodiments, as the item is moved outward, a frame member can include legs that unfold to an extended position so as to support the item in a normal use position. Thus, the legs could preferably be folded away for maximum space savings when the item is not on display and could be extended upon movement to a display position. In this regard, the legs are preferably constructed such that a tension that is created from the frame being extended (such as, e.g., similar to that occurring in common garage door systems) would allow for the tension to be eased by lifting (e.g., manually and/or through an automated device) the frame and item back into a stored position.

As illustrated above, in some embodiments a user can be required to manually move and/or replace display items to and/or from the display area, while in other embodiments, the movement and/or replacement of display items can be carried out partially and/or entirely in an automated manner. By way of example, the movement of items to and/or from the display area can be effected using a) motors or power sources, b) non-powered manual-assist devices (such as, e.g., using counterweights or other appropriate devices), and/or c) substantially or entirely manual power.

Figure 6:
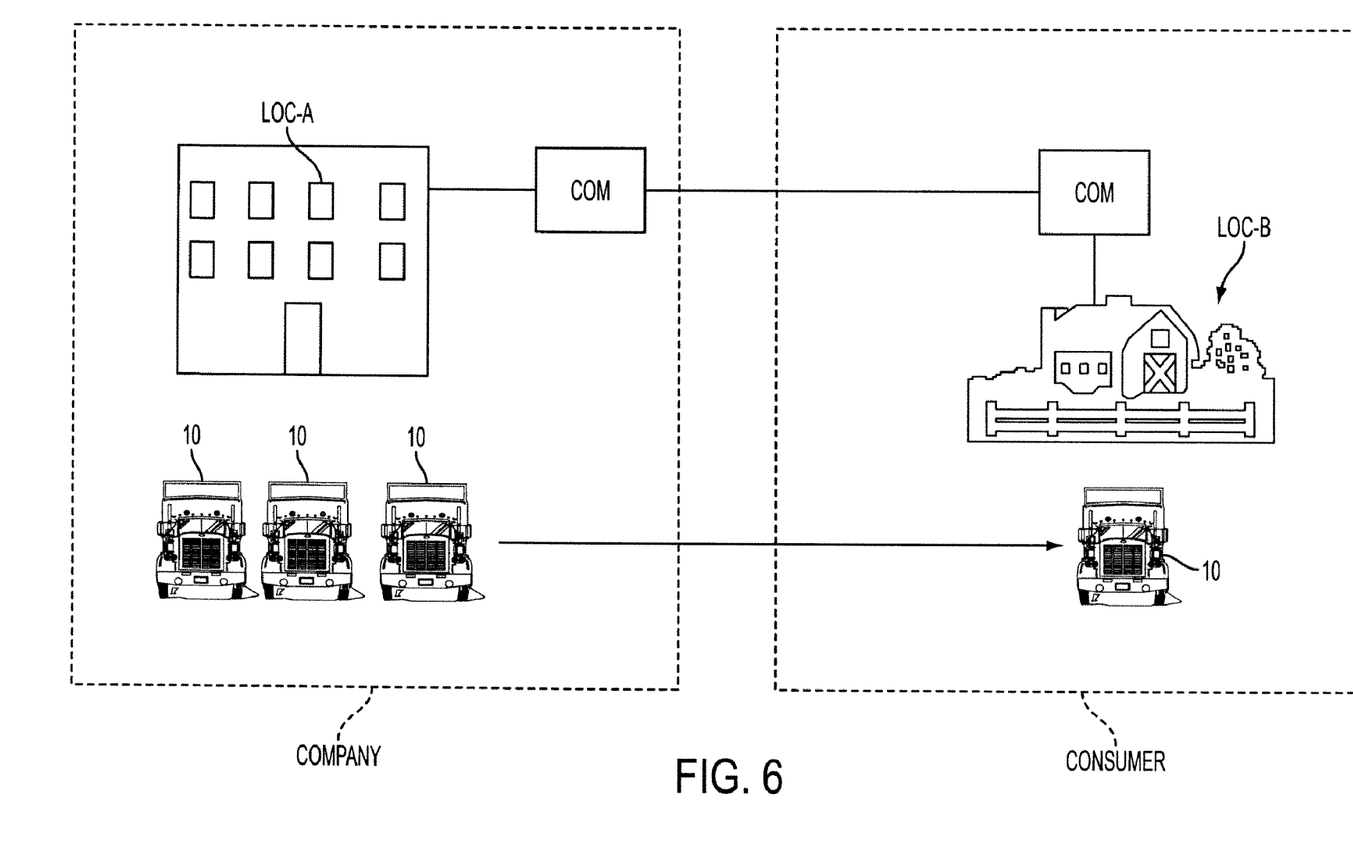
FIG. 6 is an illustrative schematic diagram showing elements of a system that can be employed in some illustrative embodiments of the invention.

FIG. 6 is an illustrative schematic diagram showing elements of a system that can be employed to carry out some illustrative embodiments of the invention. As illustrated, in some embodiments, a consumer at a consumer location (shown in dashed lines at the right side of FIG. 6) can communicate from LOC-B, such as, e.g., the consumer's home, office and/or other location at which the consumer may be present during such communications, via a communication device COM, such as, e.g., a telephone, a communication network (e.g., the Internet, using e-mail, a Web Page interface to a Web Site managed by the company and having online forms for submission of orders, requests and/or information) to a respective communication device COM at the company location (shown at the left side of FIG. 6 in dashed lines). Then, based on the consumer communication, the company can dispatch an appropriate vehicle 10 from a fleet of one or more, preferably of a plurality, of such vehicles to the consumer. As shown at the right side of FIG. 6, a vehicle dispatched to the consumer location can be used to carry out sales efforts on site for the consumer—i.e., with the consumer entering a vehicle area A1 in some illustrative embodiments as described above. While the company and consumer locations are schematically represented by single boxes in dashed lines, it should be appreciated that both the company and/or consumer may operate from a multitude of locations. By way of example, a company location may include one or more of the following locations: a main office; one or more retail offices; one or more inventory warehouses; one or more distribution center; one or more vehicle storage and/or maintenance center. In various embodiments, vehicles can originate from, be loaded with inventory at, and/or be dispatched from any appropriate location, such as, e.g., from a warehouse and/or other appropriate locations. Although not shown in FIG. 6, in some embodiments the consumer can communication to a company call center or the like, that can in-turn communicate to a warehouse or the like where an order is processed for delivery to a consumer.

In this disclosure, the terminology consumer includes, among other things, retail end users (such as, e.g., individuals, companies and/or other similar end users) as well as retailers, distributors and/or middlemen of goods or merchandise. By way of example, a salesperson could simply travel to various locations with a mobile selling device such as, e.g., described in embodiments herein to facilitate, e.g., taking of orders, rather than traveling with portions of items, such as, e.g., "buns," miniatures, or miniature size cutaways and/or the like.

While, in some embodiments, a vehicle can be sent to a consumer in response to a consumer request or communication, in some embodiments a vehicle 10 can be used in a variety of other manners, such as, e.g., for example, to carry out door-to-door sales in which salespersons ride in vehicles 10 and knock on respective home-owner's, other residents or the like's doors seeking to encourage them to consider a purchase in the vehicle—which vehicle may conveniently be located, e.g., proximate the consumer's location. Additionally, such a vehicle can alternatively travel to various site locations, such as, e.g., public malls, universities, markets, fairs, etc., in which large numbers of consumers may be located to facilitate sales efforts.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

What is claimed is:

1. A furniture sales vehicle comprising:
    a) a driver area;
    b) a furniture display area;
    c) a mechanism for selective presentation of furniture items in said furniture display area for selective presentation to a consumer, wherein said mechanism for selective presentation includes a mechanism for facilitating transfer of items between at least one storage location and at least one presentation location.

2. The vehicle of claim 1, wherein said furniture display area is inside an interior of said vehicle.

3. The vehicle of claim 1, wherein said furniture display area is external outside an exterior of said vehicle.

4. The vehicle of claim 1, wherein said vehicle is a truck.

5. The vehicle of claim 1, wherein said furniture display area is located on a trailer.

6. The vehicle of claim 4, wherein said truck includes communication means for a driver or truck operator to communicate with a dispatch office.

7. The vehicle of claim 1, wherein said furniture includes sleeping devices.

8. The vehicle of claim 7, wherein said sleeping devices include mattresses and further including mattresses displayed in said furniture display area.

9. The vehicle of claim 7, wherein said sleeping devices include beds and further including beds displayed in said furniture display area.

10. The vehicle of claim 1, wherein said furniture includes sitting devices.

11. The vehicle of claim 10, wherein said sitting devices include chairs, sofas or couches and further including chairs, sofas or couches displayed in said furniture display area.

12. The vehicle of claim 10, wherein said sitting devices include sleeper sofas and further including sleeper sofas displayed in said furniture display area.

13. The vehicle of claim 1, further including a supply area in said vehicle having a supply of furniture items for sale to consumers.

14. The vehicle of claim 1, wherein said mechanism for selective presentation includes a conveyor mechanism.

15. The vehicle of claim 1, wherein said mechanism for selective presentation includes a user operated control interface.

16. The vehicle of claim 1, wherein said mechanism for facilitating transfer includes a counterweighted lifting mechanism.

17. The vehicle of claim 1, wherein said mechanism for facilitating transfer includes a mechanism to impact vertical movement to said furniture.

18. The vehicle of claim 17, wherein said mechanism for facilitating transfer includes a mechanism to impart horizontal movement to said furniture.

19. The vehicle of claim 1, wherein said mechanism for facilitating transfer includes a mechanism to impart horizontal movement to said furniture.

20. A method for the selling of merchandise, comprising:
 a) loading merchandise within a vehicle body;
 b) transporting said vehicle body to a location;
 c) selectively presenting display items of said merchandise to said consumer in a display area inside said vehicle body, wherein said selectively presenting includes facilitating said selective presentation using a power source or manual-assist device, wherein said selectively presenting display items includes selectively moving said display items from between a display item storage area and said display area inside said vehicle body.

21. The method of claim 20, further including: collecting information from said consumer regarding at least one desired one of said items for purchase.

22. The method of claim 21, further including collecting payment from said consumer for the at least one desired one of said items for purchase on site at said vehicle.

23. The method of claim 22, wherein said collecting payment includes receiving a cash payment on site at said vehicle.

24. The method of claim 22, wherein said collecting payment includes receiving a credit card payment on site at said vehicle.

25. The method of claim 22, wherein said collecting payment includes receiving an electronic payment on site at said vehicle using a computer within or proximate said vehicle.

26. The method of claim 21, wherein said items include sleeping devices and include mattresses.

27. The method of claim 26, wherein said sleeping devices include beds, mattresses, other bed components, or sleeper sofas.

28. The method of claim 21, furthering including prior to said driving said vehicle to said consumer having said consumer provide a request for said vehicle to come to said consumer.

29. The method of claim 28, further including having said consumer provide said request orally via telephone.

30. The method of claim 29, further including having said consumer provide said request electronically via a computer network.

31. The method of claim 29, wherein said furniture display area is located on a supporting surface within said trailer.

32. The method of claim 20, wherein said vehicle body includes means for connection to a vehicle cab having a drive motor and a driver area.

33. The method of claim 20, wherein said merchandise is located after transporting said vehicle body.

34. The method of claim 20, wherein said merchandise includes sleeping devices.

35. The method of claim 20, wherein said merchandise includes furniture.

36. The method of claim 20, wherein said merchandise includes home furnishings.

37. The method of claim 20, wherein said merchandise includes carpets or floor coverings.

38. The method of claim 20, wherein said merchandise includes exercise equipment.

39. The method of claim 20, wherein said merchandise includes electronics.

40. The method of claim 20, wherein said selectively presenting display items includes selectively moving a plurality of said display items at different times to a common location in the display area.

41. The method of claim 40, wherein said common location includes a display stand.

42. The method of claim 20, wherein said selectively presenting display items includes selectively moving said display items from between a display item storage area and said display area inside said vehicle body, and wherein when in said display area inside said vehicle said items are arranged in a normal use position of the device.

43. The method of claim 42, further including having the consumer use the item in accordance with the item's normal use while said item remains in said normal use position.

* * * * *